United States Patent
Bhatt

(10) Patent No.: US 9,181,898 B2
(45) Date of Patent: Nov. 10, 2015

(54) THRUST REVERSER FOR A GAS TURBINE ENGINE WITH MOVEABLE DOORS

(75) Inventor: Jay Bhatt, Bryan, TX (US)

(73) Assignee: United Technologies Corporation, Hartford, CT (US)

( * ) Notice: Subject to any disclaimer, the term of this patent is extended or adjusted under 35 U.S.C. 154(b) by 1039 days.

(21) Appl. No.: 13/237,296

(22) Filed: Sep. 20, 2011

(65) Prior Publication Data

US 2013/0067884 A1    Mar. 21, 2013

(51) Int. Cl.
  *F02K 1/72*    (2006.01)
  *F02K 1/70*    (2006.01)
  *F02K 1/62*    (2006.01)

(52) U.S. Cl.
  CPC . *F02K 1/72* (2013.01); *F02K 1/625* (2013.01); *F02K 1/70* (2013.01)

(58) Field of Classification Search
  CPC .............. F02K 1/70; F02K 1/72; F02K 1/625
  USPC .......... 60/226.2, 230; 244/110 B; 239/265.29
  See application file for complete search history.

(56) References Cited

U.S. PATENT DOCUMENTS

| | | | | |
|---|---|---|---|---|
| 2,798,362 | A * | 7/1957 | Rainbow et al. | ......... 239/265.29 |
| 3,475,913 | A | 11/1969 | Mortlock et al. | |
| 3,500,644 | A | 3/1970 | Hom et al. | |
| 3,739,582 | A * | 6/1973 | Maison | .......... 60/226.2 |
| 3,764,096 | A * | 10/1973 | Wright | ........ 244/110 B |
| 3,815,357 | A * | 6/1974 | Brennan | ....... 60/226.2 |
| 4,073,440 | A | 2/1978 | Hapke | |
| 4,137,711 | A * | 2/1979 | Montgomery | ........ 60/226.2 |
| 4,147,028 | A | 4/1979 | Rodgers | |
| 4,373,328 | A | 2/1983 | Jones | |
| 5,090,197 | A | 2/1992 | Dubois | |
| 5,863,014 | A | 1/1999 | Standish | |
| 5,987,880 | A * | 11/1999 | Culbertson | ............ 60/204 |
| 6,438,942 | B2 | 8/2002 | Fournier et al. | |
| 6,895,742 | B2 | 5/2005 | Lair et al. | |
| 2009/0193789 | A1 * | 8/2009 | Pero | ............ 60/226.2 |
| 2009/0288386 | A1 * | 11/2009 | Marshall et al. | ........ 60/204 |
| 2010/0072324 | A1 * | 3/2010 | Teulou | ......... 244/53 R |
| 2013/0067885 | A1 * | 3/2013 | Suciu et al. | ......... 60/226.2 |
| 2014/0110503 | A1 * | 4/2014 | Teulou et al. | ....... 239/265.19 |

FOREIGN PATENT DOCUMENTS

FR    2935444    3/2010

OTHER PUBLICATIONS

European Search Report for European Patent Application No. 12185098.6 completed Mar. 18, 2014.

* cited by examiner

*Primary Examiner* — Phutthiwat Wongwian
*Assistant Examiner* — Carlos A Rivera
(74) *Attorney, Agent, or Firm* — Carlson, Gaskey & Olds, P.C.

(57) ABSTRACT

A thrust reverser includes a slider movable along an actuator shaft. An inner linkage is mounted to the slider and the inner thrust reverser door and an outer linkage is mounted to the slider and the outer thrust reverser door.

24 Claims, 6 Drawing Sheets

THRUST REVERSER FOR A GAS TURBINE ENGINE WITH MOVEABLE DOORS

BACKGROUND

The present disclosure relates to a gas turbine engine, and more particularly to a turbofan engine thrust reverser.

Gas turbine engines may include a thrust reverser to redirect engine thrust to reduce landing distance. Thrust reversers are typically articulated doors in a nacelle structure that deploy into a position that obstructs and redirects engine thrust. Clamshell thrust reversers use shells which close together to capture and redirect core engine exhaust. Cascade thrust reversers use translatable sleeves around a bypass duct. When the translatable sleeves move rearward upon deployment, blocking doors hinge radially inwardly to block the bypass duct and redirect bypass airflow through cascade arrays which redirect the bypass flow.

SUMMARY

A thrust reverser according to an exemplary aspect of the present disclosure includes a slider movable along an actuator shaft. An inner linkage is mounted to the slider and the inner thrust reverser door and an outer linkage mounted to the slider and the outer thrust reverser door A gas turbine engine according to an exemplary aspect of the present disclosure includes a core nacelle at least partially within a fan nacelle to define an annular bypass flow path between the fan nacelle and the core nacelle. An actuator is mounted within the fan nacelle to rotate an actuator shaft around a shaft axis of rotation and move a slider along a shaft axis of rotation. An inner thrust reverser door pivotally mounted to the fan nacelle to selectively extend into the annular bypass flow path when in a thrust reverse position. An outer thrust reverser door pivotally mounted to the fan nacelle to selectively extend away from the inner thrust reverser door in the thrust reverse position. An inner linkage mounted to the slider and the inner thrust reverser door and an outer linkage mounted to the slider and the outer thrust reverser door.

A method of thrust reversal for a gas turbine engine according to an exemplary aspect of the present disclosure includes: rotating an actuator shaft around an actuator shaft axis of rotation; moving a slider along the actuator shaft axis of rotation; driving an inner linkage mounted to the slider and an inner thrust reverser door; driving an outer linkage mounted to the slider and an outer thrust reverser door; pivoting the inner thrust reverser door mounted to a fan nacelle to selectively extend into an annular bypass flow path when in a thrust reverse position; and pivoting the outer thrust reverser door away from the inner thrust reverser door when in the thrust reverse position.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
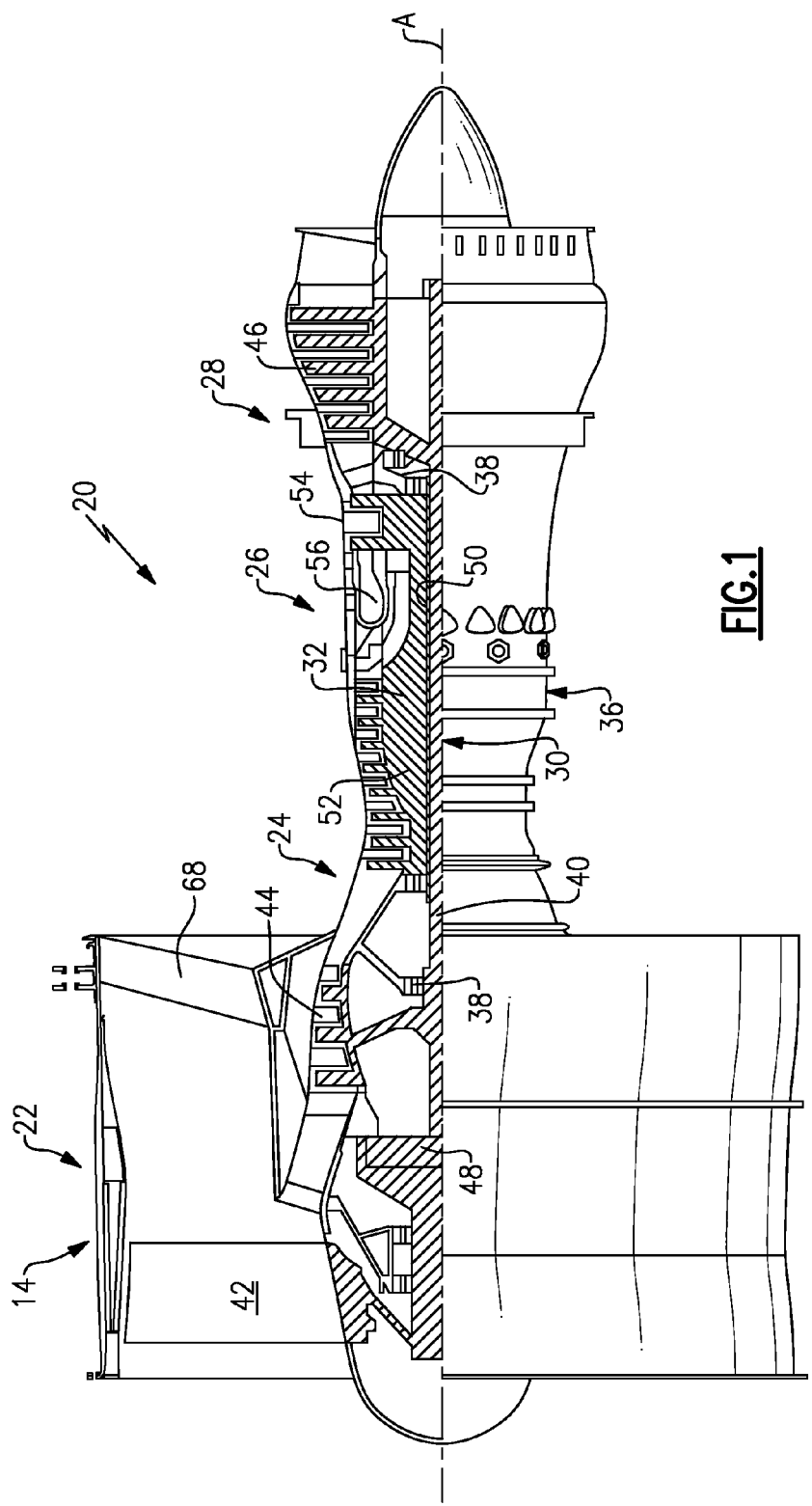
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, such as three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 may be connected to the fan 42 directly or through a geared architecture 48 to drive the fan 42 at a lower speed than the low speed spool 30 which in one disclosed non-limiting embodiment includes a gear reduction ratio of greater than 2.5:1. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
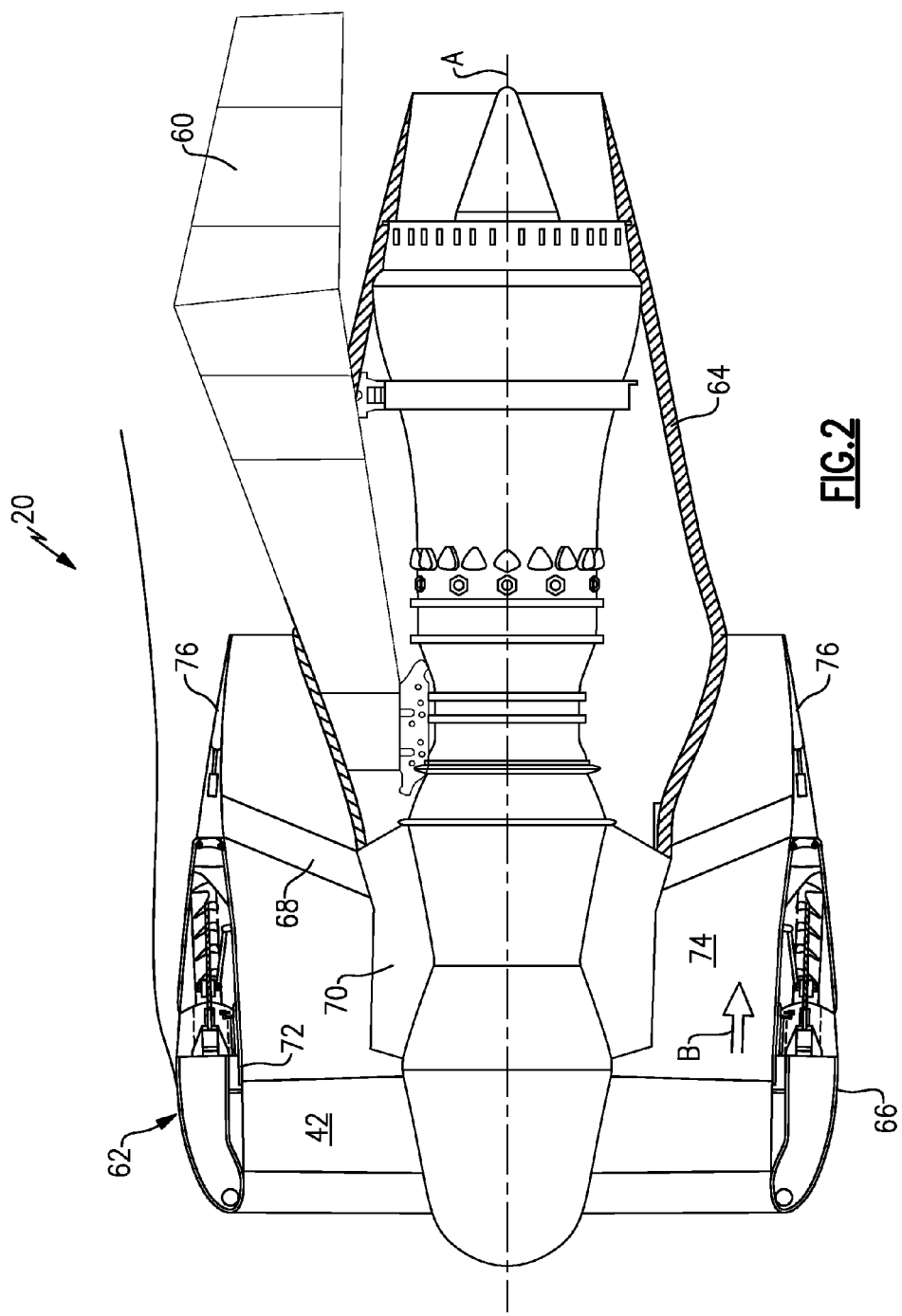
FIG. 2 is a schematic cross-sectional view of the gas turbine engine within a nacelle assembly.

With reference to FIG. 2, the gas turbine engine 20 is mounted to an engine pylon structure 60 within an engine nacelle assembly 62 as is typical of an aircraft designed for subsonic operation. The nacelle assembly 62 generally includes a core nacelle 64 and a fan nacelle 66. The fan nacelle 66 is supported relative to the core nacelle 64 by Fan Exit Guide Vanes (FEGVs) 68 which extend between a core case 70 and a fan case 72. The core case 70 and the fan case 72 are structural members which support the respective fan nacelle 66 and core nacelle 64 which define outer aerodynamic surfaces. The core case 70 is often referred to as the engine backbone and supports the rotational componentry therein. It should be understood that although a particular component arrangement is disclosed in the illustrated embodiment, various pylon structures and nacelle assemblies will benefit herefrom.

An annular bypass flow path 74 is defined between the fan nacelle 66 and the core nacelle 64. The engine 20 generates a high bypass flow arrangement with a bypass ratio in which approximately eighty percent of the airflow which enters the fan nacelle 66 becomes bypass flow. In the disclosed non-limiting embodiment, the bypass flow B communicates through the generally annular bypass flow path 74 and may be discharged from the engine 20 through a variable area fan nozzle (VAFN) 76 which defines a variable exit area for the bypass flow B.

As the fan blades within the fan section 22 are efficiently designed at a particular fixed stagger angle for an efficient cruise condition, the VAFN 76 is operated to effectively vary the fan nozzle exit area to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 3:
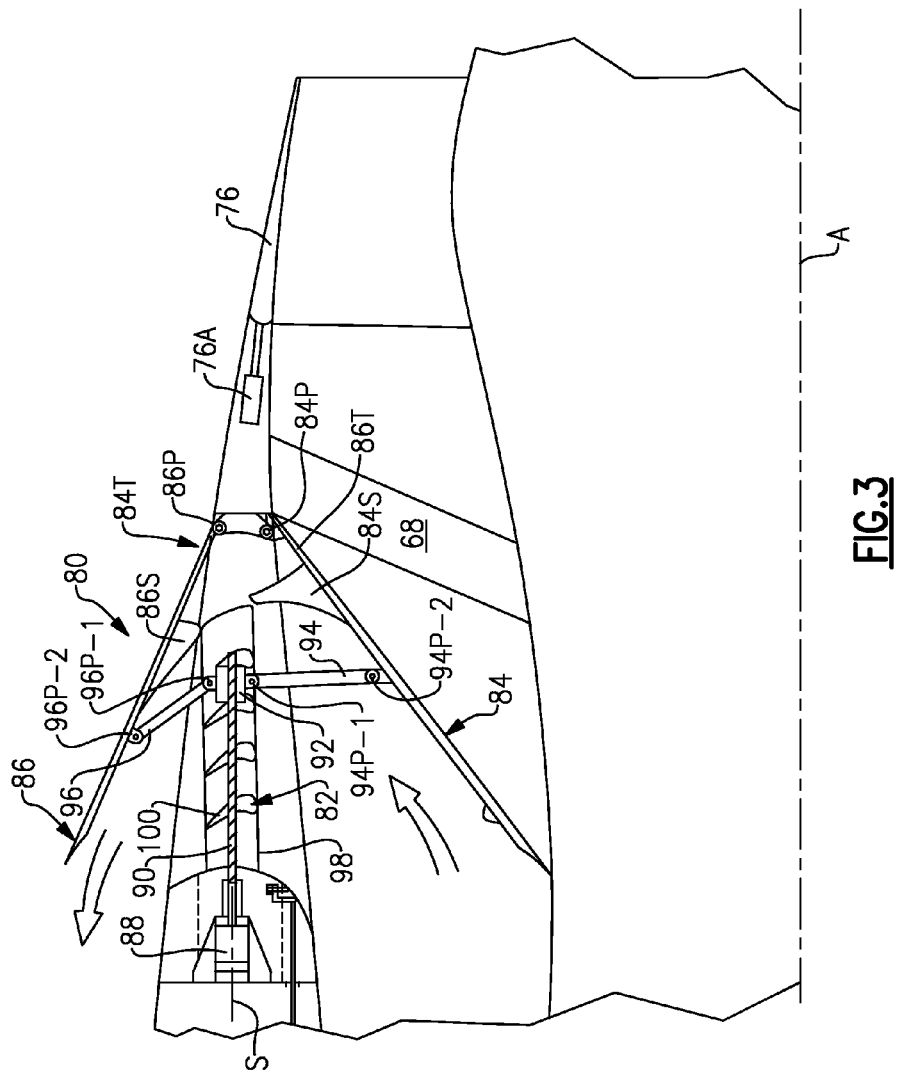
FIG. 3 is an enlarged schematic cross-sectional view of the gas turbine engine illustrating a thrust reverser.
Figure 4:
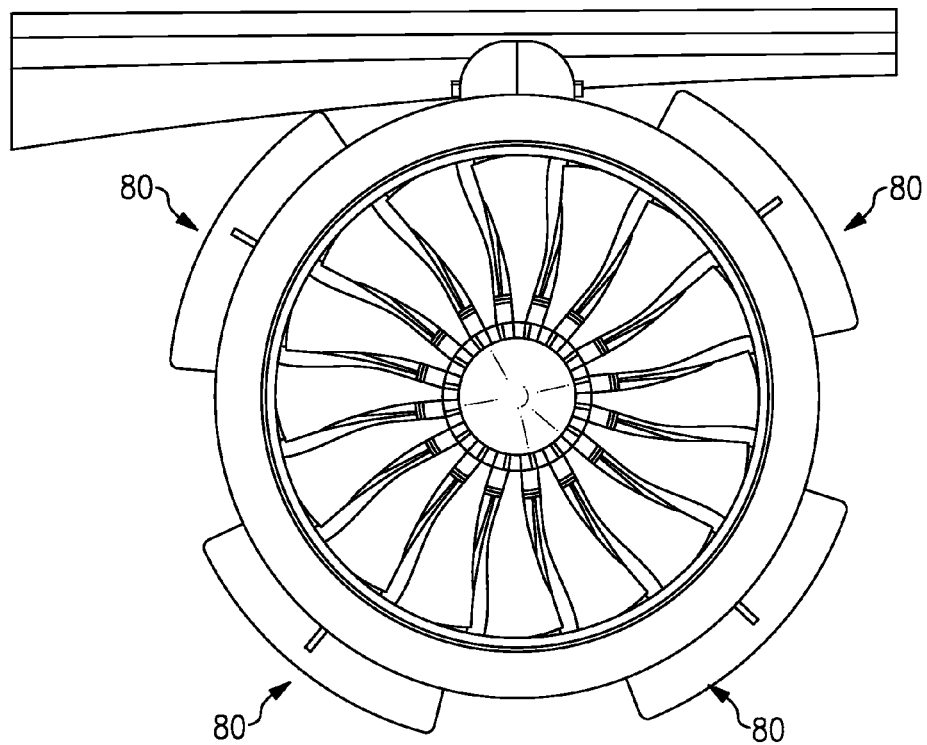
FIG. 4 is a front view of the gas turbine engine within a nacelle assembly illustrating the thrust reverser in a deployed thrust reverse position.
Figure 5:
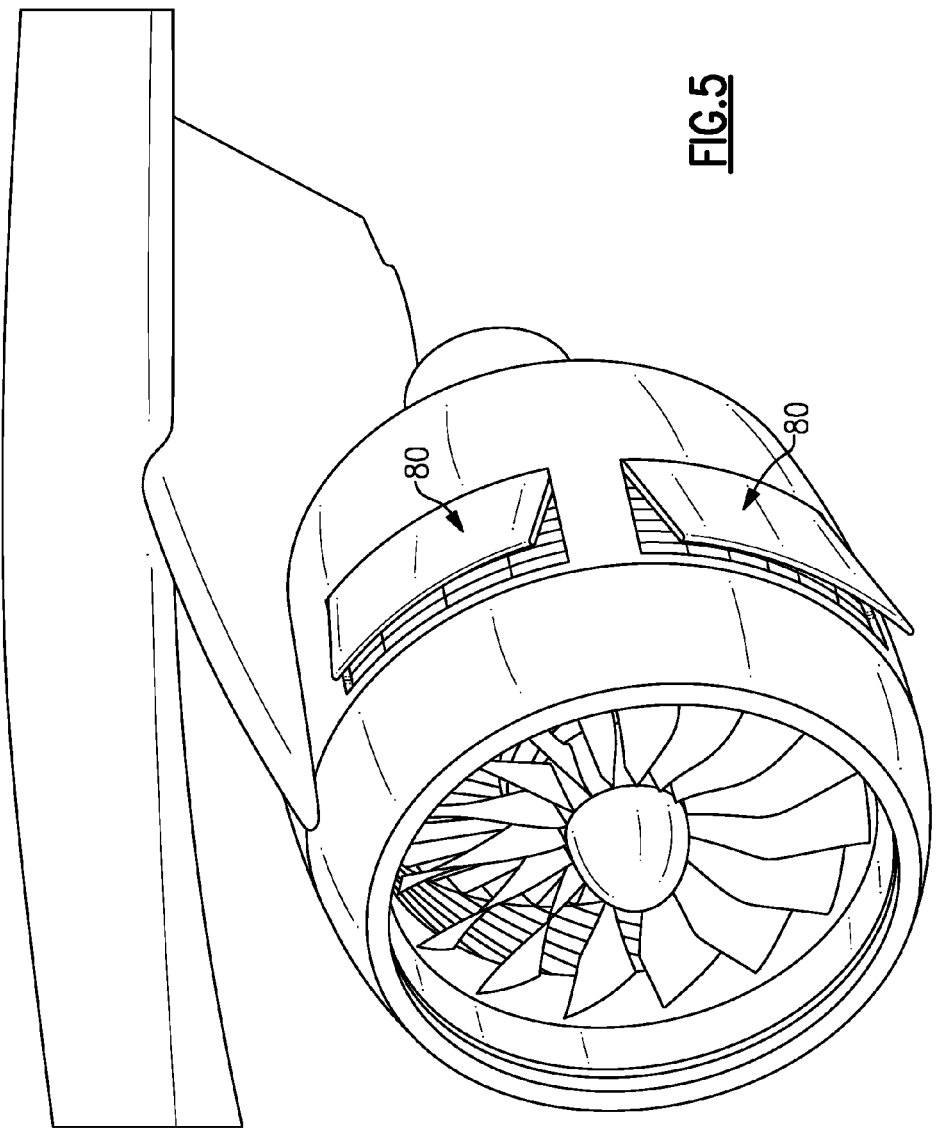
FIG. 5 is a perspective view of the thrust reverser in a deployed thrust reverse position.

With reference to FIG. 3, the fan nacelle 66 generally includes a thrust reverser 80 axially forward of the VAFN 76. Although the thrust reverser 80 is also illustrated forward of the FEGVs 68, the thrust reverser 80 may alternatively be located aft of the FEGVs 68 and the illustrated position should not be considered as limiting. As illustrated in the disclosed non-limiting embodiment, four thrust reversers 80 are circumferentially distributed around the fan section 22 for selectively reversing fan thrust, however, any number of thrust reversers 80 may additionally be provided (FIGS. 4 and 5). Although a single thrust reverser 80 will be described in detail hereafter, it should be understood that such description is applicable to each of any multiple of thrust reversers 80.

Each thrust reverser 80 generally includes a thrust reverser cascade 82, an inner thrust reverser door 84, an outer thrust reverser door 86, an actuator 88, an actuator shaft 90, a slider 92, an inner linkage 94 and an outer linkage 96. It should be understood that various other support and or aerodynamic members may alternatively or additionally provided.

The thrust reverser cascade 82 generally includes a multiple of ribs 98 and a multiple of cascade airfoils 100. The multiple of ribs 98 may be arranged in a helix formed in a direction equivalent to a rotational direction of the fan 42. The multiple of cascade airfoils 100 are arranged circumferentially about axis A to direct bypass flow in a forwardly direction to provide thrust reverse flow. The multiple of cascade airfoils 100 may be integral with or supported by the multiple of ribs 98.

The actuator 88 and the actuator shaft 90 may be located at least partially within and in-line with the thrust reverser cascade 82 and at least partially supported by the fan case 72. The actuator 88 rotationally drives the actuator shaft 90 around a shaft axis S to axially move the slider 92 along the shaft axis S. In the disclosed non-limiting embodiment, the shaft 90 may be a threaded ball screw with an external thread and the slider 92 may be a ball screw with an internal thread in meshing engagement therewith to axially move along the shaft 90 in response to rotation thereof. It should be understood that other drive arrangements such as a linear actuator may alternatively be provided to drive the slider 92.

Figure 6:
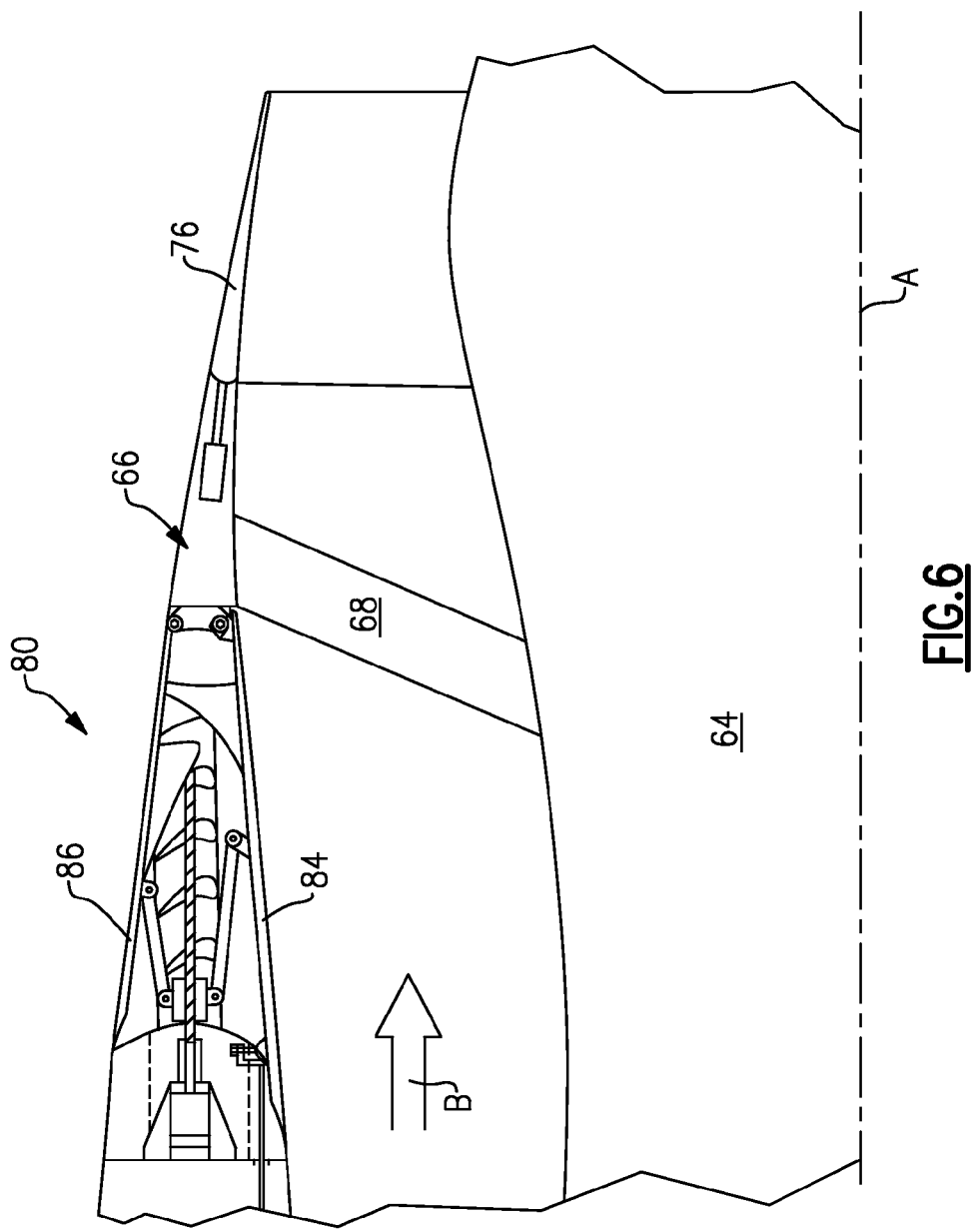
FIG. 6 is an enlarged schematic cross-sectional view of the thrust reverser in a closed position.

The inner thrust reverser door 84 is mounted to the slider 92 through the inner linkage 94 at respective pivots 94P-1, 94P-2 and the outer thrust reverser door 86 is mounted to the slider 92 through the outer linkage 96 at respective pivots 96P-1, 96P-2. The various pivotal connections may be provided in any conventional manner, for example, suitable clevis brackets may be fixedly joined to the doors for pin mounts to the linkages 94, 96 and internal frames. The linkages 94, 96 also fix the slider 92 in rotation to facilitate the transition of shaft 90 rotational motion into axial movement of the slider 92. That is, the threaded interface therebetween results in axial motion of the slider 92 and associated movement of the inner thrust reverser door 84 and the outer thrust reverser door 86 between a stowed position (FIG. 3) and a thrust reverse position (FIG. 6).

The inner thrust reverser door 84 and the outer thrust reverser door 86 are respectively mounted to the fan case 72 at a trailing edge section thereof 84T, 86T at a pivot 84P, 86P. The support structure provided for the pivots 84P, 86P of the thrust reverser doors 84, 86 further facilitates the support and mount location of an actuator system 76A (illustrated schematically) for the VAFN 76.

The inner linkage 94 and the outer linkage 96 are of a different length to control the relative movement and position of the inner thrust reverser door 84 and the outer thrust reverser door 86. In the disclosed non-limiting embodiment, the outer thrust reverser door 86 opens before the inner thrust reverser door 84 to minimize or eliminate any backpressure which may otherwise affect the fan 42 in response to actuation of the thrust reverser 80. That is, the relative length of the inner linkage 94 and the outer linkage 96 as well as the associated position of the pivot point 94P-2, 96P-2 control the respective timing, movement, and position of the inner thrust reverser door 84 and the outer thrust reverser door 86 to assure that the outer thrust reverser door 86 essentially leads the inner thrust reverser door 84 in movement toward the thrust revere position.

The inner thrust reverser door 84 and the outer thrust reverser door 86 further include a contoured inner surface 84S, 86S which eliminates any potential thrust reverser flow dead zones. The contoured inner surface 84S, 86S may be generally contoured surfaces adjacent to the respective trailing edge sections 84T, 86T to efficiently turn the incoming bypass flow during the thrust reverse position as well as overlap in the stowed position. The contoured inner surface 84S, 86S may be separate ramp shaped components attached to, or otherwise formed into, inner surfaces of each of the respective thrust reverser doors 84, 86.

In operation, the thrust reverse position of the thrust reverser 80 essentially provides for an "umbrella like" relationship in which the inner thrust reverser door 84 operates as a blocker door as well as a turning door to direct bypass flow from the inner thrust reverser door 84 toward the outer thrust reverser door 86. The contoured inner surfaces 84S, 86S cooperate with the thrust reverser cascade 82 to further guide and convert bypass flow B into thrust reverse flow.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A thrust reverser for a gas turbine engine comprising:
an actuator shaft;
a slider movable along said actuator shaft;
an inner thrust reverser door;
an outer thrust reverser door, wherein said inner thrust reverser door is pivotable in an opposite direction relative to said outer thrust reverser door to pivot away from said outer thrust reverser door when moved toward a thrust reverse position;
an inner linkage mounted to said slider and said inner thrust reverser door;
an outer linkage mounted to said slider and said outer thrust reverser door, wherein said inner linkage is of a different length than said outer linkage; and
a thrust reverser cascade, said actuator shaft at least partially extending axially through said thrust reverser cascade.

2. The thrust reverser as recited in claim 1, wherein said inner thrust reverser door and said outer thrust reverser door are each pivotally mounted along an aft section of a fan case.

3. The thrust reverser as recited in claim 2, wherein said inner thrust reverser door at least partially opens prior to said outer thrust reverser door.

4. The thrust reverser as recited in claim 1, wherein said actuator shaft is a threaded ball screw.

5. The thrust reverser as recited in claim 1, wherein the thrust reverser cascade is disposed between said inner thrust reverser door and said outer thrust reverser door.

6. The thrust reverser as recited in claim 1, further comprising a contoured surface on an inner surface of each of said inner thrust reverser door and said outer thrust reverser door.

7. The thrust reverser as recited in claim 6, wherein said contoured surface is at least partially arcuate.

8. The thrust reverser as recited in claim 1, wherein the contoured surface of each of said inner thrust reverser door and said outer thrust reverser door is adjacent a trailing edge of a an case and includes a ramp shaped component attached to the inner surface of each of said inner thrust reverser door and said outer thrust reverser door.

9. The thrust reverser as recited in claim 1, wherein each of said inner thrust reverser door and said outer thrust reverser door includes a contoured inner surface that overlap when in a non-thrust reverse position.

10. The thrust reverser as recited in claim 1, wherein the thrust reverser cascade includes a multiple of ribs and a multiple of cascade airfoils integral with the multiple of ribs.

11. The thrust reverser as recited in claim 1, wherein the inner linkage is longer than the outer linkage.

12. The thrust reverser as recited in claim 2, wherein said inner thrust reverser door and said outer thrust reverser door are each pivotally mounted to the fan case at a first location and to respective said inner linkage and said outer linkage at a second location.

13. The thrust reverser as recited in claim 6, wherein inner surface of each of said inner thrust reverser door and said outer thrust reverser door faces said actuator shaft in a non-thrust reverse position.

14. A gas turbine engine comprising:
a fan nacelle;
a core nacelle at least partially within said fan nacelle to define an annular bypass flow path between said fan nacelle and said core nacelle;
an actuator mounted within said fan nacelle;
an actuator shaft rotated by said actuator around a shaft axis of rotation;
a slider movable along said actuator shaft axis of rotation;
an inner thrust reverser door pivotally mounted to said fan nacelle to selectively extend into said annular bypass flow path when in a thrust reverse position;
an outer thrust reverser door pivotally mounted to said fan nacelle, wherein said outer thrust reverser door is pivotable in an opposite direction relative to said inner thrust reverser door to selectively extend away from said inner thrust reverse door in the thrust reverse position, wherein a contoured surface is disposed on an inner surface of each of said inner thrust reverser door and said outer thrust reverser door, said contoured surface adjacent a trailing edge section of the corresponding said inner thrust reverser door and said outer thrust reverser door, wherein at least a portion of the contoured surface of said outer thrust reverser door is radially inward of at least a portion of the contoured surface of said inner thrust reverser door when in a non-thrust reverse position;
an inner linkage mounted to said slider and said inner thrust reverser door;
an outer linkage mounted to said slider and said outer thrust reverser door; and
a thrust reverser cascade, said actuator shaft at least partially within said thrust reverser cascade.

15. The gas turbine engine as recited in claim 14, wherein the thrust reverser cascade is mounted within said fan nacelle between said inner thrust reverser door and said outer thrust reverser door.

16. The gas turbine engine as recited in claim 14, wherein said contoured surface is at least partially arcuate.

17. The gas turbine engine as recited in claim 14, wherein a variable area fan nozzle defines a portion of said annular bypass flow.

18. The gas turbine engine as recited in claim 17, wherein said variable area fan nozzle is aft of said inner thrust reverser door and said outer thrust reverser door.

19. The gas turbine engine as recited in claim 14, wherein an axial space extends at least partially through said thrust reverser cascade.

20. The gas turbine engine as recited in claim 14, wherein the actuator shaft and an axial space are disposed at least partially through said thrust reverser cascade.

21. A method of thrust reversal for a gas turbine engine comprising: rotating an actuator shaft around an actuator shaft axis of rotation, wherein said actuator shaft is at least partially within a thrust reverser cascade;
moving a slider along the actuator shaft axis of rotation;
driving an inner linkage and an inner thrust reverser door with the slider;
driving an outer linkage and an outer thrust reverser door with the slider;
pivoting the inner thrust reverser door mounted to a fan nacelle to selectively extend into an annular bypass flow path when in a thrust reverse position;
pivoting the outer thrust reverser door in a direction opposite of the inner thrust reverser door away from the inner thrust reverser door when in the thrust reverse position; and
directing a fan bypass flow with a contoured inner surface of each of the inner thrust reverser door and the outer thrust reverser door, wherein at least a portion of said contoured inner surface of said outer thrust reverser door is radially inward of at least a portion of the contoured inner surface of said inner thrust reverser door when in a non-thrust reverse position.

22. The method as recited in claim 21, wherein each said contoured inner surface is adjacent a trailing edge of the fan case and includes a ramp shaped component attached to the inner surface of each of said inner thrust reverser door and said outer thrust reverser door.

23. The method as recited in claim 21, wherein at least a portion of the contoured inner surface of said inner thrust reverser door is circumferentially aligned with at least a portion of the contoured inner surface of said outer thrust reverser door when in a non-thrust reverse position.

24. The method as recited in claim 21, wherein at least a portion of the contoured inner surface of said inner thrust reverser door is not radially spaced from at least a portion of the contoured inner surface of said outer thrust reverser door when in a non-thrust reverse position.

* * * * *

UNITED STATES PATENT AND TRADEMARK OFFICE
CERTIFICATE OF CORRECTION

PATENT NO.        : 9,181,898 B2  
APPLICATION NO.   : 13/237296  
DATED             : November 10, 2015  
INVENTOR(S)       : Jay Bhatt Page 1 of 1

It is certified that error appears in the above-identified patent and that said Letters Patent is hereby corrected as shown below:

IN THE CLAIMS:

In claim 1, column 5, line 11: after "pivotable" insert --to rotate--

In claim 8, column 5, line 42: delete "an" and insert --fan--

Signed and Sealed this  
Twelfth Day of April, 2016

Michelle K. Lee  
*Director of the United States Patent and Trademark Office*